US010534650B2

(12) United States Patent
Ryu

(10) Patent No.: US 10,534,650 B2
(45) Date of Patent: Jan. 14, 2020

(54) PARALLEL VIDEO PROCESSING USING MULTICORE SYSTEM

(71) Applicant: GACHON UNIVERSITY OF INDUSTRY-ACADEMIC COOPERATION FOUNDATION, Gyeonggi-do (KR)

(72) Inventor: Eun-Seok Ryu, Seoul (KR)

(73) Assignee: GACHON UNIVERSITY OF INDUSTRY-ACADEMIC COOPERATION FOUNDATION, Seoul (KR)

(*) Notice: Subject to any disclaimer, the term of this patent is extended or adjusted under 35 U.S.C. 154(b) by 68 days.

(21) Appl. No.: 15/716,573

(22) Filed: Sep. 27, 2017

(65) Prior Publication Data
US 2018/0089000 A1 Mar. 29, 2018

(30) Foreign Application Priority Data

Sep. 28, 2016 (KR) .......................... 10-2016-0125143

(51) Int. Cl.
*G06F 9/50* (2006.01)
*H04N 19/172* (2014.01)
*H04N 19/436* (2014.01)
*H04N 19/127* (2014.01)
*H04N 19/14* (2014.01)
*H04N 19/174* (2014.01)
*H04N 19/517* (2014.01)

(52) U.S. Cl.
CPC ......... *G06F 9/5066* (2013.01); *H04N 19/127* (2014.11); *H04N 19/14* (2014.11); *H04N 19/172* (2014.11); *H04N 19/174* (2014.11); *H04N 19/436* (2014.11); *H04N 19/517* (2014.11)

(58) Field of Classification Search
CPC .......... G06F 9/505; G06F 9/52; G06F 9/5066
USPC .................................................. 718/104, 105
See application file for complete search history.

(56) References Cited

U.S. PATENT DOCUMENTS 5,794,061 A * 8/1998 Hansen ..................... G06F 9/30
712/1
8,401,084 B2 * 3/2013 MacInnis ............. H04N 19/176
375/240.25
(Continued)

FOREIGN PATENT DOCUMENTS

JP 2015011663 1/2015

OTHER PUBLICATIONS

Hyunki Baik, et al., 'A Complexity-Based Adaptive Tile Partitioning Algorithm for HEVC Decoder Parallelization', Image Processing (ICIP), 2015 IEEE International Conference, (Sep. 2015).

*Primary Examiner* — Phillip H Nguyen
(74) *Attorney, Agent, or Firm* — Reches Patents

(57) ABSTRACT

According to one embodiment of the present disclosure, there is provided a processing method including obtaining parallelized unit information for video parallel processing; obtaining performance information that indicates performance of a plurality of cores; and allocating a plurality of video unit data to the plurality of cores based on the parallelized unit information and the performance information. The parallelized unit information includes complexity information that indicates complexity of the plurality of video unit data.

16 Claims, 24 Drawing Sheets

(56) References Cited

U.S. PATENT DOCUMENTS

| | | | | |
|---|---|---|---|---|
| 9,693,071 B1* | 6/2017 | Lin | .................. | H04N 19/436 |
| 2004/0236805 A1* | 11/2004 | Gordon | .................. | G06F 16/345 |
| 2008/0137736 A1* | 6/2008 | Richardson | .................. | H04N 19/61 |
| | | | | 375/240.03 |
| 2008/0219349 A1* | 9/2008 | Huang | .................. | H04N 19/176 |
| | | | | 375/240.15 |
| 2009/0307464 A1* | 12/2009 | Steinberg | .................. | G06F 9/505 |
| | | | | 712/31 |
| 2012/0014451 A1* | 1/2012 | Lee | .................. | H04N 19/436 |
| | | | | 375/240.16 |

* cited by examiner

FIG. 4

| Test Sequence | Resolution | Frame length | Number of Tiles | QP | Decoding Time Gain (%) | | |
|---|---|---|---|---|---|---|---|
| | | | | | RA | AI | LDB |
| PeopleOnStreet | 3840 X 2160 | 150 | 6 (3 X 2) | 22 | 28.11 | 25.81 | 21.80 |
| | | | | 27 | 19.05 | 9.20 | 11.77 |
| | | | | 32 | 17.83 | 14.31 | 7.43 |
| | | | | 37 | 7.45 | 12.53 | 11.98 |
| Traffic | 3840 X 2048 | 300 | 6 (3 X 2) | 22 | 19.55 | 20.74 | 23.35 |
| | | | | 27 | 22.31 | 21.20 | 19.24 |
| | | | | 32 | 25.06 | 16.67 | 19.69 |
| | | | | 37 | 24.72 | 28.11 | 23.20 |

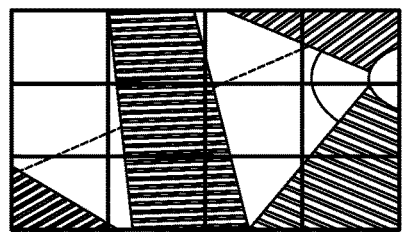
FIG. 9A
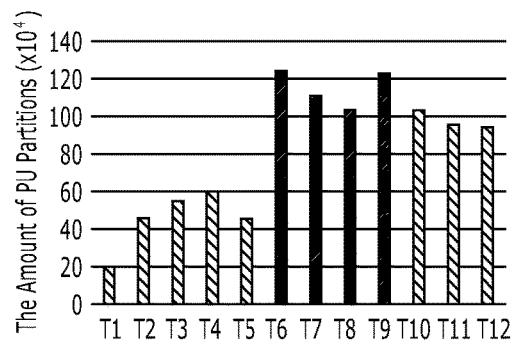
FIG. 9B
FIG. 9C
FIG. 9D

FIG. 11 min $C^*$ — 1110 such that $C^* = \max_{K}\{C_k\}$ — 1120

$\sum_{i \in S_k} P_i = C_k$ — 1130

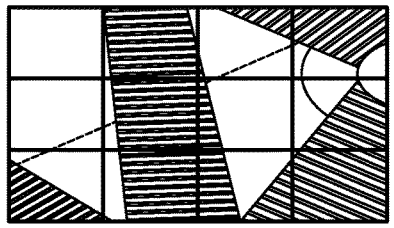

FIG. 12A

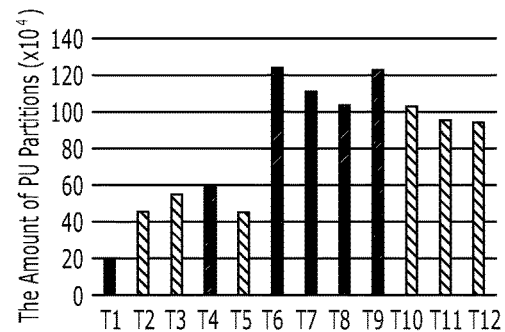

FIG. 12B $$\text{Complexity to be allocated to Big Core} = \left( \frac{\text{Performance of Big Core}}{\text{Performance of big core} \times \text{The number of big core} + \text{Performance of little core} \times \text{The number of little core}} \right) \times (1+\alpha) \times \text{Overall Complexity}$$

$$\text{Complexity to be allocated to Little Core} = \left( \frac{\text{Performance of Little Core}}{\text{Performance of big core} \times \text{The number of big core} + \text{Performance of little core} \times \text{The number of little core}} \right) \times (1+\alpha) \times \text{Overall Complexity}$$

| Big Cluster | Cortex-A57 r0p0 |
|---|---|
| Little Cluster | Cortex-A53 r0p0 |
| Number of Cores | 2 Big Cores (1.1 GHz) |
| | 4 Little cores (850MHz) |
| Memory | 8GB DDR RAM |

| Loop | 6 Tiles | | 12 Tiles | | |
|---|---|---|---|---|---|
| | Fixed | | Fixed | | Adapted |
| | Control | Proposed | Control | Proposed | Proposed |
| 1 | 68.52 | 64.64 | 68.22 | 62.65 | 56.13 |
| 2 | 67.96 | 64.55 | 68.14 | 62.63 | 55.96 |
| 3 | 68.13 | 64.50 | 68.33 | 62.31 | 55.86 |
| 4 | 68.00 | 64.64 | 68.21 | 62.46 | 56.11 |
| 5 | 67.98 | 64.62 | 68.06 | 62.63 | 55.87 |
| 6 | 68.47 | 64.58 | 68.22 | 62.37 | 56.03 |
| 7 | 68.36 | 64.58 | 68.40 | 62.72 | 55.86 |
| 8 | 68.20 | 64.66 | 68.24 | 62.44 | 55.71 |
| 9 | 68.10 | 64.57 | 68.17 | 62.15 | 55.88 |
| 10 | 67.91 | 64.56 | 68.36 | 62.42 | 55.90 |
| Average | 68.16 | 64.59 | 68.23 | 62.47 | 55.93 |
| Gain | | 5.24% | | 8.44% | 18.03% |

FIG. 15

| parallelized_unit_info_file { | bits |
|---|---|
| version_info | u(8) |
| file_size | u(64) |
| for (j=0; j < file_size; j++ ) { | |
| poc_num | u(32) |
| info_mode | u(3) |
| user_info_flag | u(1) |
| unit_num | u(12) |
| if ( info_mode == 1) { | |
| unit_complexity_list [ unit_num ] | u(16) |
| } | |
| if (info_mode == 2) { | |
| unit_list_for_bigcore [ unit_num ] | u(12) |
| unit_list_for_littlecore [ unit_num ] | u(12) |
| } | |
| if (user_info_flag) { | |
| user_info_size | u(8) |
| for (i=0; i < user_info_size; i++ ) { | |
| user_info_list [ i ] | u(v) |
| } | |
| } | |
| } | |

FIG. 16

```
<parallelized_unit_info>
<info_mode = "2" user_info_flag ="0" unit_num="6" unit_id_bigcore = "3 6" unit_id_littlecore="1, 2, 4, 5">
</parallelized_unit_info>
```

FIG. 17

| parallelized_unit_info (payloadSize) { | bits |
|---|---|
| info_mode | u(3) |
| user_info_flag | u(1) |
| unit_num | u(12) |
| if ( info_mode == 1) { | |
| unit_complexity_list [ unit_num ] | u(16) |
| } | |
| if (info_mode == 2) { | |
| unit_list_for_bigcore [ unit_num ] | u(12) |
| unit_list_for_littlecore [ unit_num ] | u(12) |
| } | |
| if (user_info_flag) { | |
| user_info_size | u(8) |
| for (i=0; i < user_info_size; i++ ) { | |
| user_info_list [ i ] | u(v) |
| } | |
| } | |
| } | |

FIG. 18

| Sei_payload( payloadType, payloadSize ) { | Descriptor |
|---|---|
| if( payloadType == 0 ) | |
| buffering_period( payloadSize ) | |
| ............ | |
| else if ( payloadType == 186 ) | |
| parallelized_unit_info ( payloadSize ) | |
| ............ | |

1810

PARALLEL VIDEO PROCESSING USING MULTICORE SYSTEM

RELATED APPLICATIONS

This application claims priority and the benefit of Korean Patent Application No. 10-2016-0125143, filed on Sep. 28, 2016, in the Korean Intellectual Property Office, the entire contents of which are incorporated herein by reference in their entirety.

BACKGROUND

1. Field

The present disclosure relates to parallel video processing using a multicore system.

2. Description of the Related Art

Recently, high-resolution video contents have widely spread. Accordingly, many devices capable of processing the high-resolution video contents are also spreading.

SUMMARY OF THE DISCLOSURE

The present disclosure provides a technology of efficiently processing videos in parallel in a computing system having multiple cores by considering performance of the cores and complexity of an input video.

According to one embodiment of the present disclosure, there is provided a processing method including obtaining parallelized unit information for video parallel processing; obtaining performance information that indicates performance of a plurality of cores; and allocating a plurality of video unit data to the plurality of cores based on the parallelized unit information and the performance information. The parallelized unit information includes complexity information that indicates complexity of the plurality of video unit data.

According to another embodiment of the present disclosure, there is provided a processor including a plurality of cores; and at least one memory configured to include instructions that are executed by at least one of the plurality of cores. The instructions include instructions for performing, obtaining parallelized unit information for video parallel processing; obtaining performance information that indicates performance of the plurality of cores; and allocating a plurality of video unit data to the plurality of cores based on the parallelized unit information and the performance information. The parallelized unit information includes complexity information that indicates complexity of the plurality of video unit data.

According to the present disclosure, processing speed of an input video may increase, and power consumption may be reduced.

BRIEF DESCRIPTION OF THE DRAWINGS

FIG. 4 illustrates experimental results of the first tile allocation method according to some embodiments of the present disclosure.

FIGS. 9A to 9D illustrate the second tile allocation method according to some embodiments of the present disclosure.

FIG. 11 illustrates a model formulation for the third tile allocation method according to some embodiments of the present disclosure.

FIGS. 12A to 12D illustrate the third tile allocation method according to some embodiments of the present disclosure.

FIG. 15 illustrates syntax of parallelized unit information per file, chunk, and video picture group according to some embodiments of the present disclosure.

FIG. 16 illustrates representation of an XML form of the parallelized unit information according to some embodiments of the present disclosure.

FIG. 17 illustrates syntax of parallelized unit information per video picture, according to some embodiments of the present disclosure.

FIG. 18 illustrates an SEI message including the parallelized unit information according to some embodiments of the present disclosure.

DETAILED DESCRIPTION OF THE EMBODIMENT

Figure 1A:
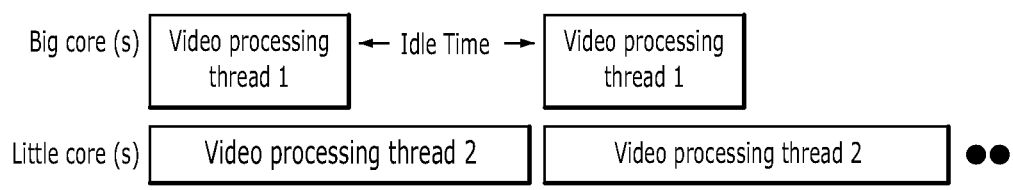
FIGS. 1A and 1B illustrate a decoding time of a processor according to some embodiments of the present disclosure.

It should be noted that the technical terms used in the present disclosure are used only to describe specific embodiments and are not intended to limit the technical idea disclosed in the present disclosure. In addition, unless otherwise defined in the present disclosure, the technical terms used in the present disclosure should be construed in a sense that is generally understood by those having ordinary skill in the art to which the technology disclosed in the present disclosure belongs, and should not be construed in an excessively broad sense, or in an excessively narrow sense. In addition, when the technical term used in the present disclosure is a misleading technical term that does not accurately describe the technical idea disclosed in the present disclosure, the technical term should be understood to be replaced by technical term that can be understood by those having ordinary skill in the art to which the technology disclosed in the present disclosure belongs. In addition, the general terms used in the present disclosure should be construed in accordance with the predefined or prior context, and should not be construed in an excessively narrow sense.

As used in the present disclosure, terms including an ordinal number, such as first, second, or the like may be used to describe various configuration elements, but the configuration elements should not be limited by the terms. The terms are used only for the purpose of distinguishing one configuration element from another configuration element. For example, a first configuration element may be referred to as a second configuration element without departing from the scope of the present disclosure, and similarly, the second configuration element may also be referred to as the first configuration element.

Hereinafter, embodiments of the present disclosure will be described with reference to the accompanying drawings in more detail, and the same or similar elements are denoted by the same reference numerals or symbols regardless of the reference numerals or symbols, and redundant description thereof will be omitted.

In addition, in the following description of the present disclosure, when it is determined that detailed description of the related known technology can obscure the gist of the technology disclosed in the present disclosure, the detailed description thereof will be omitted. In addition, it should be noted that the attached drawings are only for easy understanding of concept of the technology disclosed in the present disclosure, and the technical idea should not be construed as limited by the appended drawings.

Figure 1B:
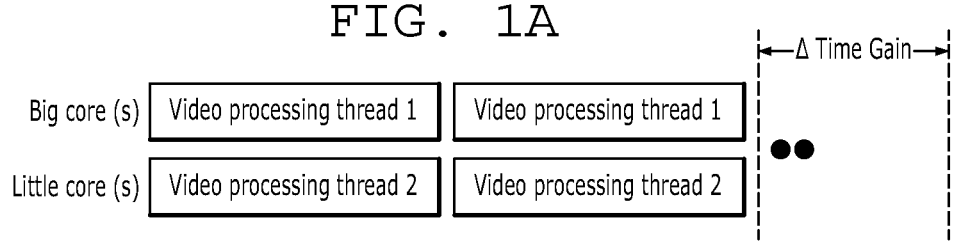

FIGS. 1A and 1B illustrate a decoding time of a processor according to some embodiments of the present disclosure.

The processor according to some embodiments of the present disclosure may include multicores. For example, each of the multicores may include a plurality of big cores of a first performance and a plurality of little cores of a second performance. The first performance may be higher than the second performance.

FIG. 1A illustrates a decoding time of a processor in accordance with some embodiments.

The processor of the related art allocates multiple video unit data to asymmetric multicores without considering performance of asymmetric multicores and/or computational complexity of a plurality of video unit data (for example, tiles).

For example, even if the processor of the related art completes processing a first video processing thread (Video processing Thread 1) using the big cores with a high-performance, the processor has to wait until the little cores completes processing a second video processing thread (Video Processing Thread 2).

Therefore, video processing delay and/or idle time is unavoidable for the processor of the related art.

FIG. 1B illustrates a decoding time of a processor according to some embodiments of the present disclosure.

The processor according to some embodiments of the present disclosure may allocate a plurality of video unit data to asymmetric multicores by considering performance of asymmetric multicores and/or computational complexity of a plurality of video unit data.

For example, there are three possible methods that the processor in accordance with some embodiments of the present disclosure can allocate the plurality of video unit data (for example, tiles) to the asymmetric multicores as follows.

As a first method, the processor can allocate a plurality of tiles to the asymmetric multicores, where the picture is divided into non-uniform tiles.

As a second method, the processor can allocate the same number of tiles to each core in the asymmetric multicores, where the picture is divided into uniform tiles. In this case, the processor can allocate the tiles of high computational complexity within the picture to the big cores, while maintaining the number of tiles allocated to each core the same.

As a third method, the processor can allocate the optimized number of tiles to the asymmetric multicores, where the picture is divided into the uniform tiles. In this case, the processor can allocate more complex tiles within the picture to the big cores, and the number of tiles allocated to each core can be different from each other.

Thus, the processor according to some embodiments of the present disclosure may control the time to process the first video processing thread by the big cores and the time to process the second video processing thread by the little cores so that they can be completed at a similar time. In addition, the processor according to some embodiments of the present disclosure may result in an increase of energy efficiency, an improvement of performance, and a time gain when compared to the processor of the related art.

Hereinafter, it is assumed that a video unit data according to some embodiments of the present disclosure can be called a tile.

Figure 2A:
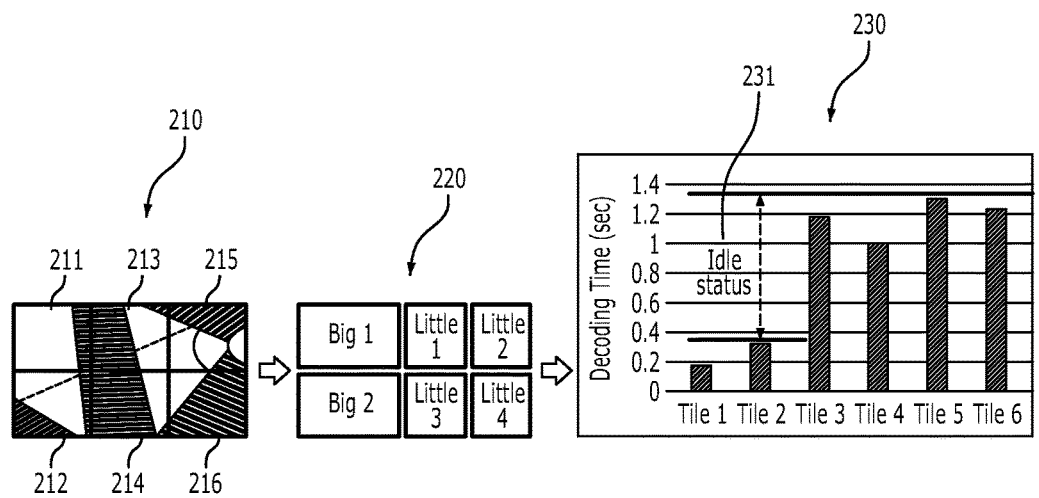
FIGS. 2A and 2B illustrate a first tile allocation method according to some embodiments of the present disclosure.
Figure 2B:
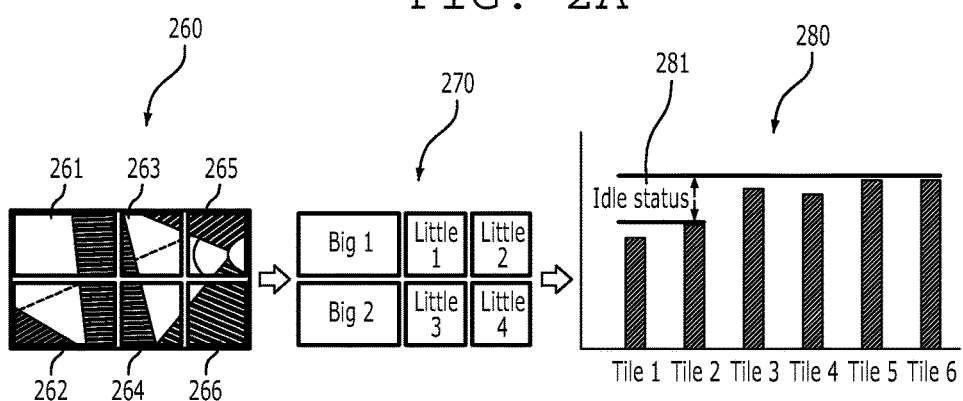

FIGS. 2A and 2B illustrate a first tile allocation method according to some embodiments of the present disclosure.

FIG. 2A illustrates a tile allocation method performed by using a processor of the related art.

A picture 210 can be divided into uniform tiles. For example, the picture 210 can be divided into six uniform tiles 211, 212, 213, 214, 215, and 216.

A processor 220 of the related art may include two big cores of Big1 and Big2 and four little cores of Little1, Little2, Little3, and Little4.

The processor 220 of the related art may allocate a plurality of tiles to asymmetric multicores, without considering performance of the asymmetric multicores and/or computational complexity of the plurality of tiles.

For example, the processor 220 of the related art allocates the first tile (Tile1) 211 to the first big core Big1, the second tile (Tile2) 212 to the second big core Big2, the third tile (Tile3) 213 to the first little core Little1, the fourth tile (Tile4) 214 to the second little core Little2, the fifth tile (Tile5) 215 to the third little core Little3, and the sixth tile (Tile6) 216 to the fourth little core Little4.

Referring to a graph 230 indicating an average decoding time per tile, there is a large difference in the decoding time between the big cores and the little cores. Also, an idle status 231 of the big cores is shown for a long time after the end of decoding.

For example, if video parallel decoding is performed as in the processor 220 of related art, there is a large difference in the average decoding time between the tiles of Tile1 and Tile2 decoded by the big cores of Big1 and Big2 and the tiles of Tile3, Tile4, Tile5, and Tile6 decoded by the little cores of Little1, Little2, Little3, and Little4.

This is because the computational complexity of each tile and the performance of each core to which the thread is allocated are affecting the decoding time for each tile. The processor 220 of the related art cannot avoid a situation where it should wait until the decoding of the tile having the longest decoding time is completed even if decoding of the tile1 having the shortest decoding time is completed, and thereby, the efficiency of the parallel processing decreases.

FIG. 2B illustrates the first tile allocation method according to some embodiments of the present disclosure.

A picture 260 can be divided into non-uniform tiles. For example, the picture 260 may be divided into six non-uniform tiles 261, 262, 263, 264, 265, and 266.

A processor 270 according to some embodiments of the present disclosure may include two big cores of Big1 and Big2 and four little cores of Little1, Little2, Little, and Little4.

The processor 270 may allocate a plurality of tiles to the asymmetric multicores by considering performance of the asymmetric multicores and/or computational complexity of the plurality of tiles. The processor 270 may allocate the tiles with high complexity to the big core with high performance, the tiles with low complexity the little core with low performance.

For example, the processor 270 may allocate a first tile (Tile1) 261 with high complexity to the first big core Big1, a second tile (Tile2) 262 with high complexity to the second big core Big2, a third (Tile3) 263 with low complexity to the first little core Little1, a fourth tile (Tile4) 264 with low complexity to the second little core Little2, a fifth tile (Tile5) 265 with low complexity to the third little core Little3, and a sixth tile (Tile6) 266 with low complexity to the fourth little core Little4.

Referring to a graph 280 indicating an average decoding time per tile, there is a small difference in the decoding time between the big cores and the little cores. Also, there is an advantage that an idle status 281 of the decoded big cores is shortened.

Accordingly, in the first tile allocation method which uses the processor 270 according to some embodiments of the present disclosure, a picture can be divided into non-uniform tiles of different sizes based on the computational complexity of a video picture, and the non-uniform tiles can be allocated to the asymmetric multicores, and thereby, it is possible to get an improvement in decoding speed and performance.

Figure 3:
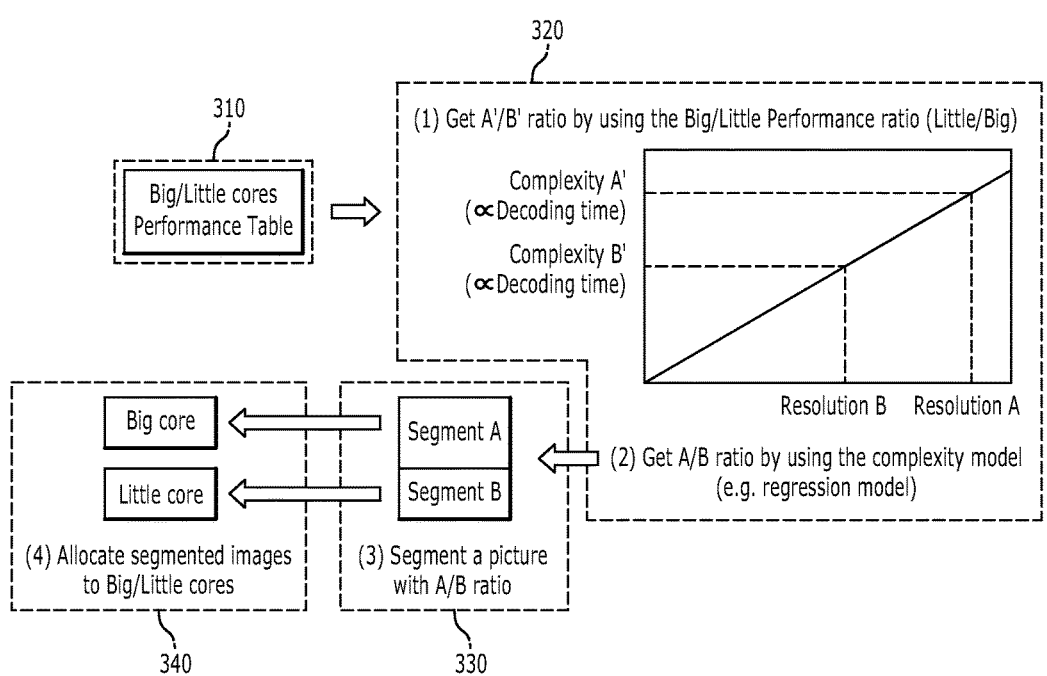
FIG. 3 illustrates a procedure of the first tile allocation method according to some embodiments of the present disclosure.

FIG. 3 illustrates a procedure of a first tile allocation method according to some embodiments of the present disclosure.

A processor according to some embodiments of the present disclosure may obtain performance information indicating performance of a plurality of cores (310).

For example, the plurality of cores may include at least one big core and/or at least one little core. In addition, the performance may include at least one of processing speed, power consumption, and availability of the plurality of cores. In addition, the performance information may include a performance table indicating performance of at least one big core and/or at least one little core.

Thereafter, the processor may obtain complexity allocation information including information on complexity to be allocated to each core on the base of the performance information.

For example, the greater decoding time and/or resolution of data is, the higher the complexity is. In addition, the complexity may mean resolution indicating a size of the tile.

The complexity allocation information may include resolution information indicating the size of the tile to be allocated to each core.

Specifically, the processor may acquire complexity ratio information indicating a ratio of the complexity to be allocated to each core, based on a performance ratio between the big core and the little core.

For example, the complexity ratio information may include complexity A' to be allocated to the big core, complexity B' to be allocated to the little core, and/or a ratio complexity B'/Complexity A' between the complexity to be allocated to the big core and the complexity to be allocated to the little core.

Thereafter, the processor may obtain resolution information indicating a size of a screen to be allocated to each core by using a complexity model, based on the complexity ratio information (320).

For example, the complexity model may include a regression model. In addition, the complexity model may represent a relationship between complexity and resolution.

For example, the resolution information may include resolution A indicating a size of a screen to be allocated to the big core, resolution B indicating a size of a screen to be allocated to the little core, and/or a ratio between the size of the screen to be allocated the big core and the size of the screen to be allocated to the little core.

Thereafter the processor may divide the picture into a plurality of tiles, based on the complexity allocation information (330).

For example, the greater the value indicated by the complexity allocation information is, the larger the sizes of the tiles to be divided is.

Thereafter, the processor may allocate the plurality of tiles to the plurality of cores, based on the complexity allocation information (340).

For example, the larger the size of the tiles is, the more the performance of the core to be allocated is improved.

FIG. 4 illustrates experimental results of the first tile allocation method according to some embodiments of the present disclosure.

FIG. 4 illustrates results that the processor according to some embodiments of the present disclosure decoded video images (PeopleOnStreet, Traffic) that are high efficiency video coding (HEVC) official test sequence by using the first tile allocation method.

As illustrated in the figure, if the processor decodes a picture using the first tile allocation method, a decoding time gain increases compared to the technology of related art.

Figure 5:
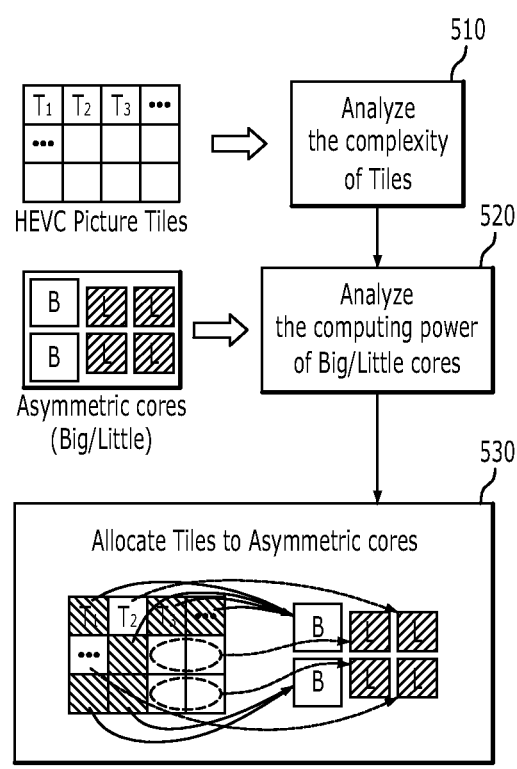
FIG. 5 illustrate second and third tile allocation methods according to some embodiments of the present disclosure.

FIG. 5 illustrates the second and third tile allocation methods according to some embodiments of the present disclosure.

A processor according to some embodiments of the present disclosure may obtain complexity information indicating complexity of the plurality of tiles (510).

For example, the complexity information may be measured by the processor, and may be provided by a manufacturer and/or a provider through a broadcast network and/or a broadband. The complexity of the plurality of tiles may be determined by the number of prediction units (PUs) of the HEVC.

In addition, the processor may obtain performance information indicating performance of a plurality of cores (520).

For example, multiple cores may include asymmetric multicores. In addition, the performance information may be measured by the processor, and/or may be provided to a broadcast network and/or a broadband by a manufacturer and/or a provider. For example, the asymmetric multicores may include at least one big core and/or at least one little core.

In addition, the processor may allocate the plurality of tiles to a plurality of cores, based on the performance information and/or the complexity information (530).

For example, the processor may allocate the same number of tiles to the plurality of cores using the second tile allocation method.

In addition, the processor may allocate the number of tiles optimized for each core to the plurality of cores by using a third tile allocation method.

Hereinafter, a method of allocating the plurality of tiles to asymmetric multicores by using the processor will be described in more detail.

Figure 6A:
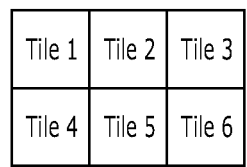
FIGS. 6A and 6B illustrate a parallelization method according to some embodiments of the present disclosure.
Figure 6B:
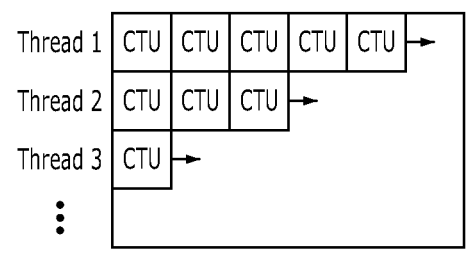

FIGS. 6A and 6B illustrate a parallelization method according to some embodiments of the present disclosure.

The processor according to some embodiments of the present disclosure may process pictures in parallel using a tile method and a waveform parallel processing (WPP) method.

FIG. 6A illustrates the tile method according to some embodiments of the present disclosure.

The tile method is a method of dividing a picture into a plurality of tiles, each having a rectangular shape, and of encoding and/or decoding the pictures in parallel on a tile basis.

Each tile may have a rectangular shape, and each tile may be divided by a boundary of a coding tile unit (CTU). In addition, each tile may not have dependencies between the tiles.

If the picture is divided into the same number of tiles and slices, the number of CTUs located at a boundary between the tiles is smaller than the number of CTUs located at a boundary between the slices. Accordingly, according to the tile method, a coding performance may be improves compared to a case where the picture is into the same number of slices.

In addition, if the picture is divided into the plurality of slices by using a slice, slice header data is additionally used in each independent slice segment. However, the tile does not use additional header data for each division region, unlike the slice. Since the tile transmits only the division information of the tile through a picture parameter set (PPS), there is not much additional information bit as compared to the slice to which a slice header is added for each division region.

As such, according to the tile method, degradation of a bit rate may be reduced compared to the slice, and at the same time, may effectively support parallelization of a data level through region division.

FIG. 6B illustrates a WPP method according to some embodiments of the present disclosure.

The WPP method is a method of dividing a picture into each CTU row and of encoding and/or decoding in parallel on a CTU row basis.

According to the WPP method, the CTUs of a first row may be encoded and/or decoded in a normal way, and the CTUs of remaining rows may be encoded and/or decoded with reference to the previous row. That is, according to the WPP method the CTUs located on the left, the top, and a diagonal top may be first encoded and/or decoded, and thereafter, may encode and/or decode current CTUs.

According to the WPP method, histological encoding or decoding of an entropy portion may also be supported. For this, according to the WPP method, a sub-bitstream is generated on each CTU row basis and a location of the sub-bitstream is transmitted to the slice header, and thereby, histological entropy coding for a plurality of sub-bitstreams is enabled within the slice data.

According to the WPP method, prediction is performed within a screen and/or motion prediction and the like using information of a block previously coded in an upper CTU row in a pixel encoding portion, and thus, there is an advantage in which encoding efficiency is hardly reduced and an encoder and/or a decoder can be parallelized.

Hereinafter, the tile method will be mainly described.

Figure 7:
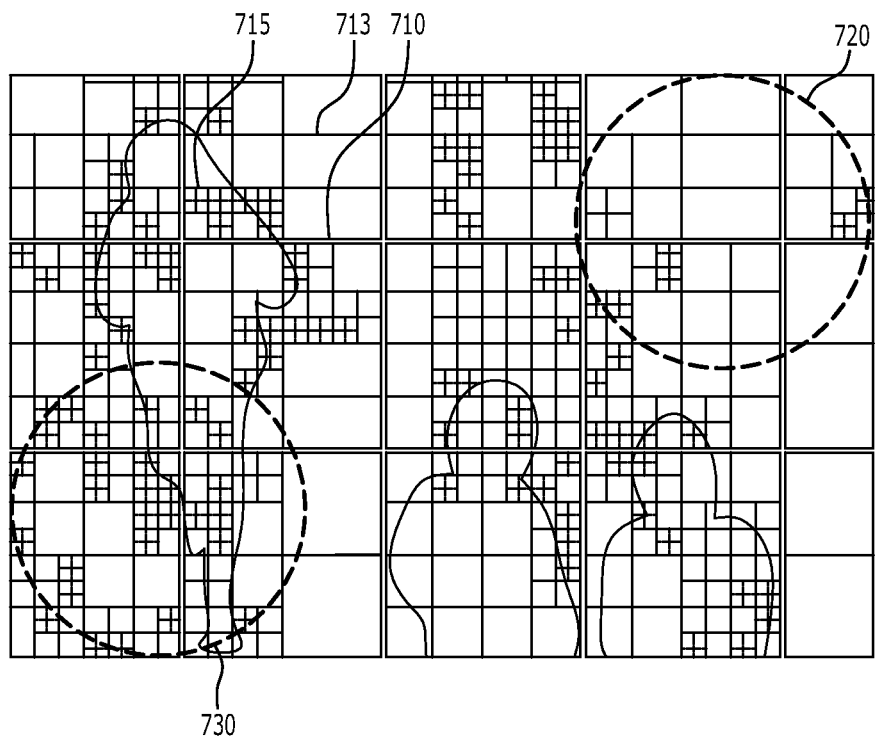
FIG. 7 illustrates a prediction unit for complexity prediction according to some embodiments of the present disclosure.

FIG. 7 illustrates a prediction unit for complexity prediction according to some embodiments of the present disclosure.

The processor according to some embodiments of the present disclosure may predict complexity of a picture based on resolution, a quantization parameter (QP), an object of a picture, and/or prediction unit (PU) of a tile, and the like. Hereinafter, a method of predicting complexity using the prediction unit (PU) of the tile will be mainly described.

A picture may be divided into a plurality of tiles in a rectangular region, each tile may be divided into a plurality of coding tree units (CTUs) 710, each coding tree unit 710 includes a plurality of coding units (CUs) 713, and each coding unit 713 may be partitioned into a plurality of prediction units (PUs) 715.

The coding tree unit 710 is a unit including a luminance component Y of a 64×64 pixel and two chrominance components Cb and Cr of 32×32 pixels corresponding to the luminance components, similarly to a concept of a macro block.

The coding unit 713 is a basic unit of coding in which inter-picture prediction and/or intra-picture prediction are performed, and may be divided into a quad-tree form from the coding tree unit 710. For example, a size of the coding unit 713 may include a 64×64 pixel, a 32×32 pixel, a 16×16 pixel, and/or an 8×8 pixel. One coding unit 713 may be one coding tree unit 710 and may be a unit smaller than one coding tree unit 710.

The prediction unit 715 may be a basic unit of prediction and may be divided into a single layer multiple division mode form from the coding unit 713. One prediction unit 715 may be one coding unit 713 and may be a unit smaller than one coding unit 713.

The amount of the prediction unit 715 included in the coding unit 713 is closely related to computational complexity and/or processing power. Accordingly, the processor according to some embodiments of the present disclosure may predict complexity of a picture based on the number of prediction units 715.

For example, a region having a large number of the prediction units 715 may be a region with high complexity, and a region having a small number of the prediction units 715 may be a region with low complexity.

Referring to the first region 720, a first region 720 includes a small number of the prediction units 715. Accordingly, complexity of the first region 720 is low.

Referring to a second region 730, the second region 730 includes a large number of the prediction units 715. Accordingly, complexity of the second region 730 is high.

The processor according to some embodiments of the present disclosure may directly calculate complexity information indicating the complexity, or may receive the complexity information through a broadcasting network and/or a broadband.

Figure 8:
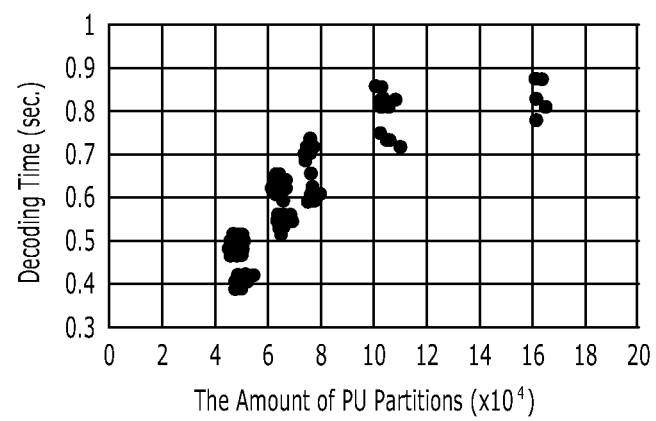
FIG. 8 illustrates a relationship between the number of prediction units and the complexity according to some embodiments of the present disclosure.

FIG. 8 is a diagram illustrating a relationship between the number of prediction units and the complexity according to some embodiments of the present disclosure.

FIG. 8 illustrates decoding time of bitstreams encoded into a random access (RA) configuration. The X axis represents the number of prediction units included in the coding tree unit, and the Y axis represents the complexity. Since the complexity may be proportional to the decoding time, the decoding time is illustrated instead of the complexity in FIG. 8.

As illustrated in FIG. 8, it can be seen that the greater the number of prediction units is, the longer the decoding time is and the higher the complexity is.

FIGS. 9A to 9D illustrate the second tile allocation method according to some embodiments of the present disclosure.

FIG. 9A illustrates a picture divided into uniform tiles. For example, the picture may be divided into 12 uniform tiles.

FIG. 9B illustrates the number of prediction units (PUs) included in each tile. The greater the number of prediction units is, the higher the complexity of the tile is. For example, the tiles T1, T2, T3, T4, T5, T10, T11, and T12 may include a small number of prediction units and may have low complexity. In addition, the tiles T6, T7, T8, and T9 may include a large number of prediction units and may have high complex.

FIG. 9C illustrates a tile allocation method of related art.

The processor of related art sequentially allocates the tile to the core without considering complexity of the tiles and/or performance of the cores.

For example, the processor first allocates the tiles T1, T2, T3, and T4 to big cores B1 and B2. Thereafter, the processor sequentially allocates the tiles T5, T6, T7, T8, T9, T10, T11, and T12 to little cores L1, L2, L3, and L4.

FIG. 4D illustrates the second tile allocation method according to some embodiments of the present disclosure.

The processor may allocate the tile to the core by considering the complexity of the tile and/or the performance of the core. The processor may allocate the tiles with high complexity to the big cores, and may allocate the tiles with low complexity to the little cores. In this case, the processor may allocate the same number of tiles to each core.

For example, the processor may allocate the tiles T6, T7, T8, and T9 with high complexity to the big cores B1 and B2. In addition, the processor may allocate the tiles with low complexity T1, T2, T3, T4, T10, T11, and T12 to the little cores L1, L2, L3, and L4. In addition, the processor may allocate two tiles to each core.

Figure 10A:
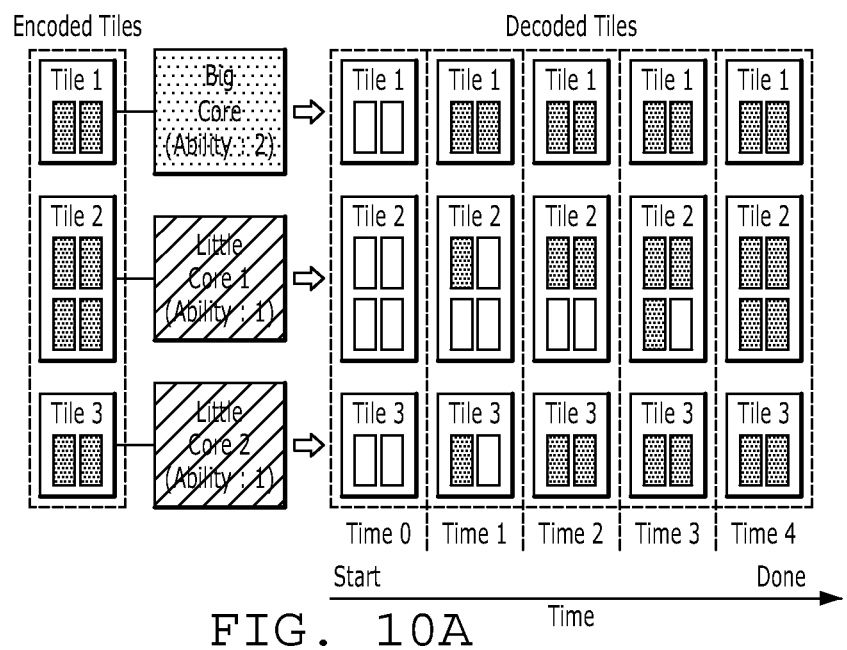
FIGS. 10A and 10B illustrate decoding time by a tile allocation method of the related art and decoding time by the second tile allocation method according to some embodiments of the present disclosure.
Figure 10B:
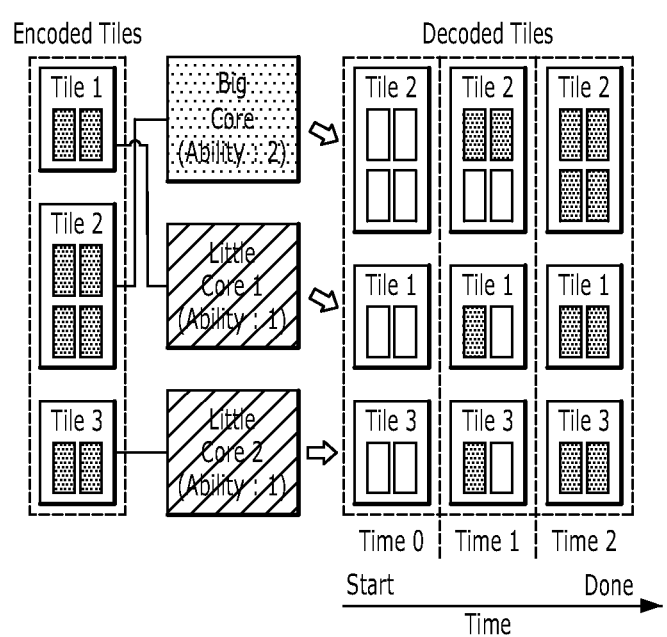

FIGS. 10A and 10B illustrate decoding time by a tile allocation method of related art and decoding time by the second tile allocation method according to some embodiments of the present disclosure.

FIG. 10A illustrates the decoding time by the tile allocation method of related art. A processor of related art sequentially allocates tiles to cores without considering complexity of the tiles and/or performance of the cores.

For example, the first tile Tile1 may include two work units, the second tile Tile2 may include four work units, and the third tile Tile3 may include two work units. The work unit may be a unit of work requiring a certain amount of time for the processor to process. The work unit may include at least one coding tree unit. The number of work units may be proportional to the complexity.

For example, the processor allocates the first tiles Tile1 to a big core Big Core, the second tiles Tile2 to a first little core Little Core 1, the third tiles Tile3 to a second little core Little Core 2.

As a result, the big core decodes all the first tiles Tile1 at a first time Time1, but the first little core Little Core 1 decodes all the second tiles Tile2 at a fourth time Time4.

FIG. 5B illustrates the decoding time by the second tile allocation method according to some embodiments of the present disclosure. The processor according to some embodiments of the present disclosure may allocate the tiles to the cores by considering the complexity of the tiles and/or the performance of the cores.

For example, the processor may allocate the first tile Tile1 having a small number of work units to the first little core Little Core 1 with low performance, the second tile Tile2 having a large number of work units to the big core Big Core with high performance, and the third tile Tile3 having a small number of work units to the second little core Little Core 2 with low performance.

As a result, the big core, the first little core Little Core 1, and the second little core Little Core 2 may decode each tile at a second time Time 2.

As such, the second tile allocation method according to some embodiments of the present disclosure may reduce the decoding time as compared to the tile allocation method of related art.

Figure 11:
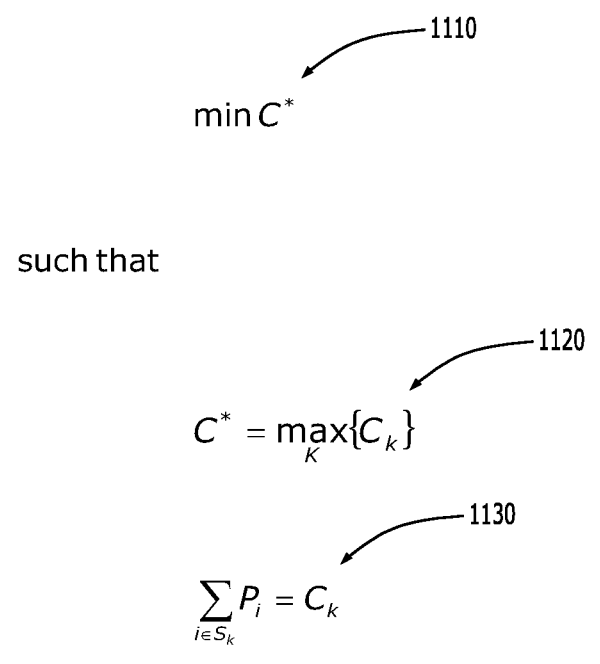

FIG. 11 illustrates a model formulation for the third tile allocation method according to some embodiments of the present disclosure.

Since it takes longer calculation time (for example, decoding time) as the complexity is higher, the third tile allocation method according to some embodiments of the present disclosure may minimize a maximum value (C*) of the complexity allocated to the cores (1110).

C* may indicate a maximum value of complexity $C_k$ allocated to a kth core (1120). Here, k is 1, 2, 3, . . . , K. K may indicate a number of the core.

$C_k$ may indicate complexity allocated to the kth core. $C_k$ may indicate the number of prediction units included in all the tiles allocated to the kth core (1130). Here, $P_i$ may indicate the number of prediction units of an ith tile. $S_k$ may indicate a set of tiles allocated to the kth core.

The third tile allocation method may optimally allocate a plurality of tiles to a plurality of cores based on the model formulation (1110). A specific method is described below.

FIGS. 12A to 12D illustrate the third tile allocation method according to some embodiments of the present disclosure.

FIG. 12A illustrates a picture divided into uniform tiles. For example, the picture may be divided into 12 uniform tiles.

FIG. 12B illustrates the number of prediction units (PUs) included in each tile. The greater the number of prediction units is, the higher complexity of the tiles is. For example, the tiles T1, T2, T3, T4, T5, T10, T11, and T12 may include a small number of prediction units and may have low complexity. In addition, the tiles T6, T7, T8, and T9 may include a large number of prediction units and may have high complex.

FIG. 12C illustrates complexity allocation information indicating complexity to be allocated to each core.

A processor may generate complexity allocation information indicating complexity to be allocated to each core in order to allocate complexity to be processed by each core to each core.

For example, the processor may include at least one big core and at least one little core. In addition, the complexity allocation information may include complexity to be allocated to the big core and/or complexity to be allocated to the little core. Here, the overall complexity may indicate overall complexity of each picture, and may indicate the number of overall prediction units (PUs) included in each picture. In addition, a may be a predetermined constant value.

FIG. 4D illustrates the third tile allocation method according to some embodiments of the present disclosure.

A processor may allocate a plurality of tiles to a plurality of cores, by considering the complexity of the tiles and/or the performance of the cores. The processor may allocate the optimized number of tiles to asymmetric multicores. In this case, the processor may allocate the tiles with high complexity to the big cores, and the number of tiles allocated to each core may be different.

For example, the processor may allocate the tiles T6, T7, T8, and T9 with high complexity to the big cores B1 and B2.

In order to allocate the maximum number of prediction units that each core can process to each core, the processor may additionally allocate the tiles with low complexity not allocated within a range indicated by the complexity allocation information to the cores to which the tiles are previously allocated. For example, the processor may additionally allocate the tile T1 with low complexity to the big core B1, and the tile T4 with low complexity to the big core B2.

Thereafter, the processor may allocate the remaining tiles T2, T3, T5, T10, T11, and T12 to the little cores L1, L2, L3, and L4.

Thus, the processor may allocate the different number of tiles to each core.

Figure 13:
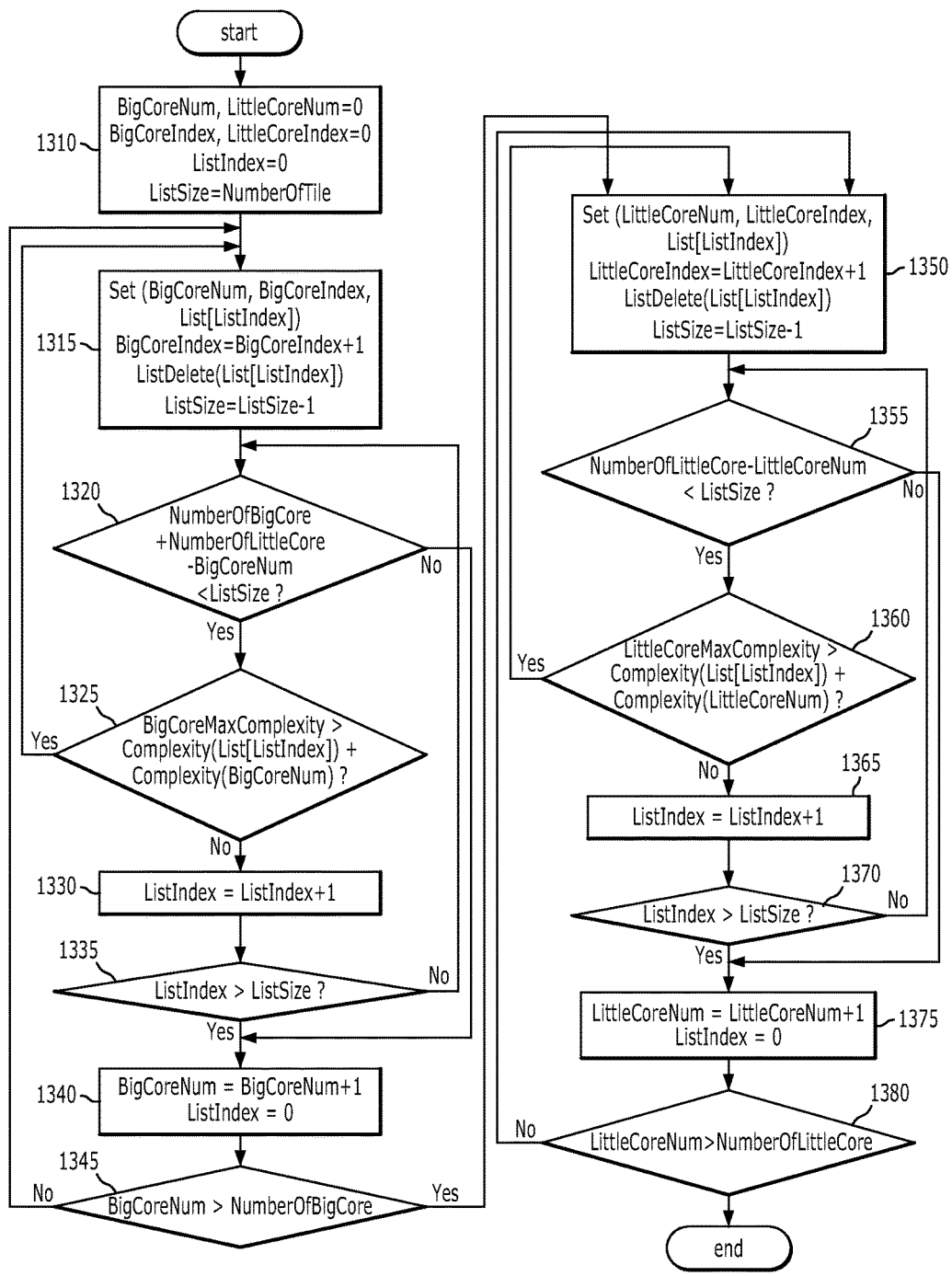
FIG. 13 illustrates an algorithm of the third tile allocation method according to some embodiments of the present disclosure.

FIG. 13 illustrates an algorithm of the third tile allocation method according to some embodiments of the present disclosure.

A processor may include at least one big core and at least one little core.

The processor may initialize at least one variable (1310).

For example, the processor may initialize a big core number BigCoreNum, a little core number LittleCoreNum, an index of the big core BigCoreIndex, an index of the little core index LittleCoreIndex, a size of a tile list ListIndex, and a size of the tile list ListSize.

For example, the size of the tile list ListSize may be initialized to the number of all tiles included in a picture NumberOfTile, and the remaining variables may be initialized to '0'.

In addition, the processor may obtain complexity information indicating the complexity of the tiles and performance information indicating the performance of video tiles.

In addition, the processor may generate complexity allocation information indicating complexity to be allocated to each core. For example, the complexity allocation information may include complexity to be allocated to the big core and/or complexity to be allocated to the little core.

In addition, the processor may sort the tiles in descending order based on the complexity of the tiles. For example, the processor may sort the tiles in descending order based on the number of prediction units (PUs) per tile. The sorted tiles may configure the tile list.

The processor may first allocate at least one tile to at least one big core (1315-1345) and may allocate the remaining tiles to at least one little core (1350-1380).

First, a method of allocating at least one tile to at least one big core using a processor will be described (1315 to 1345).

The processor may allocate at least one tile to the big core based on the big core number BigCoreNum, the index of the big core BigCoreIndex, and the index of the tile list ListIndex (1315).

For example, at least one tile has to be allocated to each core, and thereby, the processor may allocate the first tile to the big core, even if complexity of the first tile is greater than complexity to be allocated to the big core.

The processor may increase a value of the index of big core BigCoreIndex) by '1'. In addition, the processor may exclude the tiles allocated to the big core from the tile list. In addition, the processor may decrease the size of tile list ListSize by '1'. The size of tile list ListSize may indicate a size of the current tile list (that is, the number of tiles not allocated yet).

The processor may determine that whether or not the number of cores not allocated is less than the number of tiles not allocated in order to allocate at least one tile to each core (1320).

For example, the processor may determine whether or not a value of the number of big cores NumberOfBigCore+the number of little cores NumberOfLittleCore−the big core number BigCoreNum is smaller than a value of the size of tile list.

If the number of cores not allocates is less than the number of tiles not allocated, the processor may proceed to step 1325. If the number of cores not allocated is greater than or equal to the number of tiles not allocated, the processor may proceed to step 1340.

The processor may determine whether or not additional tiles can be allocated to the big core (1325).

For example, the processor may determine whether or not a maximum complexity BigCoreMaxComplexity that can be allocated to the big core is greater than a value obtained by adding complexity of the current tile Complexity(List[ListIndex]) to the complexity Complexity(BigCoreNum) allocated to the corresponding big core until now. For example, the maximum complexity BigCoreMaxComplexity that can be allocated to the big core may be the complexity allocation information described above.

If the processor can an allocate additional tile to the big core, the processor may proceed to step 1315. If the processor is unable to allocate an additional tile to the big core, the processor may proceed to step 1330.

That is, the processor calculates whether or not complexity of each tile is within a range of complexity that can be sequentially allocated to the big core based on the complexity of each tile in the tile list.

If complexity of a specific tile is within the range of complexity that can be allocated to the big core, the processor may allocate the corresponding tile to the big core. If the complexity of the specific tile deviates from the range of complexity that can be allocated to the big core, the processor may calculate whether or not next data in the tile list (that is, the complexity of the tiles of the next order) is within the complexity that can be allocated to the big core. Since the tiles are sorted in descending order based on the complexity of the tiles, the complexity of a next tile is lower than the complexity of the current tile.

The processor may increase a value of the index of the tile list ListIndex by '1' (1330).

The processor may review whether or not all the tiles not allocated can be sequentially allocated to the big core (1335).

For example, the processor may determine whether or not the value of the index of the tile list ListIndex is greater than a value of the size of the tile list ListSize (1335).

If the value of the index of the tile list ListIndex is greater than the value of the size of the tile list ListSize, the processor may proceed to step 1340. That is, it may mean that the processor review whether or not all the tiles not allocated can be allocated to the corresponding big core.

If the value of the index of the tile list ListIndex is less than or equal to the value of the size of the tile list ListSize, the processor may proceed to step 1320. That is, it may mean that the processor does not reviews whether or not some tiles not allocated can be allocated to the corresponding big core.

The processor may indicate the next big core to increase a value of the big core number BigCoreNum by '1' (1340). In addition, the processor may initialize the value of the index of tile list ListIndex to '0'.

The processor may determine whether or not at least one tile is allocated to all the big cores (1345).

For example, the processor may determine whether or not the big core number BigCoreNum is greater than the number of big cores NumberOfBigCore (1345).

If the big core number BigCoreNum is greater than the number of big cores BumberOfBigCore, the processor may proceed to step 1350. That is, the processor may allocate at least one remaining tile to the little core.

If the big core number BigCoreNum is less than or equal to the number of big cores NymberOfBigCore, the processor may proceed to step 1315. That is, the processor may allocate at least one remaining tile to the next big core.

If the processor completes allocating at least one tile to all the big cores, the processor may allocate the remaining tiles to at least one little core in the same manner as described above (1350-1380).

The processor may allocate at least one tile to all the cores. If the processor allocates tiles as described above, there may not be a tile to be allocated to the last core. Thus, the processor may leave the last one without allocating, even if the tiles are not allocated to the second core (big core or little core) from behind as many tiles as possible within the maximum complexity that can be allocated to the corresponding core. That is, the last one tile may be allocated to the last core.

FIG. 14 illustrates decoding time of the tile allocation method according to some embodiments of the present disclosure.

Figures 14A, 14B, 14C:
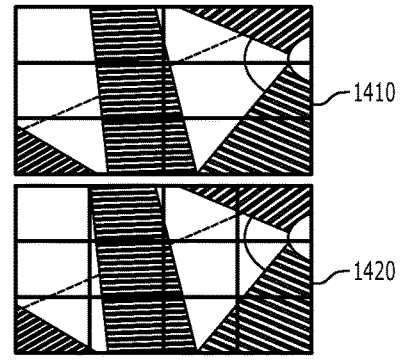
FIGS. 14A to 14C illustrate the decoding time of the tile allocation method according to some embodiments of the present disclosure.

FIG. 14A illustrates an experimental environment for measuring the decoding time.

For example, a processor according to some embodiments of the present disclosure may include two big cores and four little cores.

FIG. 14B illustrates pictures used in the experiment.

A PeoPleOnStreet picture (3840×2160, 150 frames) having a random access (RA) configuration and a quantization coefficient QP value of 22 is used for an encoding test and/or a decoding test. The pictures are divided into six tiles 1410 and/or 12 tiles 1420, respectively.

If the picture 1410 divided into six tiles is used, the processor may allocate each tile to each core. That is, the processor may allocate one tile for each core. If the picture 1420 divided into 12 tiles is used, the processor may allocate at least one tile to each core.

FIG. 5C illustrates a decoding time gain of the tile allocation method according to some embodiments of the present disclosure.

If the picture 1410 divided into six tiles is used, the tile allocation method according to the embodiment of the disclosure generates a decoding time gain of approximately 5.24%.

If the picture 1420 divided into 12 tiles is used, the second tile allocation method according to some embodiments of the present disclosure generates the decoding time gain of approximately 8.44%. If the picture 1420 divided into 12 tiles is used, the third tile allocation method according to some embodiments of the present disclosure generates the decoding time gain of approximately 18.03%.

FIG. 15 illustrates a syntax of parallelized unit information per file, chunk, and video picture group according to some embodiments of the present disclosure.

The parallelized unit information parallelized_unit_info according to some embodiments of the present disclosure may be calculated by a processor (or a receiver or an image reception device), and may also be transmitted through a broadcast network and/or a broadband for each video file, chunk, or many video picture group.

The parallelized unit information may include at least one of version_info information, file_size information, poc_num information, info_mode information, user_info_flag information, unit_num information, unit_complexity_list information, unit_list_for_bigcore information, unit_list_for_littlecore information, user_info_size information, and/or user_info_list information.

The version_info information may indicate a version of a signaling protocol and/or the parallelized unit information. For example, the version_info information may be represented as 8-bit unsigned information.

The file_size information may indicate a total size of the parallelized unit information. For example, the file_size information may indicate a size of the parallelized unit information for a file, a chunk, and/or a video picture group. For example, the file_size information may be represented as 64-bit unsigned information.

The poc_num information may indicate picture order count (POC) information in a video standard such as HEVC. In addition, the poc_num information may indicate a frame number in the H.264 AVC standard. For example, the poc_num information may be represented as 32-bit unsigned information.

The info_mode information may indicate a mode of information included in the parallelized unit information. For example, the info_mode information may be represented as 3-bits unsigned information. For example, if a value of the info_mode information is '0', the mode of information may be indicated to be the same as a mode of the previous information. If the value of info_mode information is '1', the mode of information may indicate a computational complexity list mode for all video unit data (for example, tiles). If the value of the info_mode information is '2', the mode of information may indicate a video unit list mode to be allocated to big cores and a video unit list mode to be allocated to little cores for all the video unit data (for example, tiles).

The user_info_flag information may indicate whether or not there is additional user information additionally transmitted by a provider and/or a user. For example, the user_info_flag information may be represented as one-bit unsigned information. For example, if a value of the user_info_flag information is '0', there may be no additional user information transmitted by the provider and/or the user. If the value of the user_info_flag information is '1', there may be additional user information transmitted by the provider and/or the user.

The unit_num information may indicate the number of video unit data. For example, the unit_num information may be represented as 12-bit unsigned information. For example, the unit_num information may indicate the number of tiles in the screen.

The unit_complexity_list information may include a computational complexity list of video unit data. The unit_complexity_list information may be complexity information indicating complexity of a plurality of video unit data. For example, if a value of info_mode information is '1', the parallelized unit information may include the unit_complexity_list information. If the video unit is a tile, the unit_complexity_list information may include a computational complexity list of all the tiles in the picture. Each computational complexity may be represented as 16-bit unsigned information.

The unit_list_for_bigcore information may include a list of video unit data to be allocate to the big core.

The unit_list_for_littlecore information may include a list of video unit data to be allocated to the little core.

For example, if a value of info_mode information is '2', the parallelized unit information may include the unit_list_for_bigcore information and/or the unit_list_for_littlecore information. The unit_list_for_bigcore information and/or the unit_list_for_littlecore information may be a number list of video unit data and may be represented as 12-bit unsigned information.

The processor may allocate at least one tile to the big core and/or the little core based on the unit_list_for_bigcore information and/or the unit_list_for_littlecore information.

The user_info_size information may indicate a size of additional user information transmitted by a provider and/or a user. For example, the user_info_size information may be represented as 8-bit unsigned information.

The user_info_list information may include a list of additional user information and/or actual additional user information. For example, each additional user information may be represented as unsigned changeable bit information.

FIG. 16 illustrates representation of an XML format of the parallelized unit information according to some embodiments of the present disclosure.

The parallelized unit information parallelized_unit_info according to some embodiments of the present disclosure may be represented as the XML format in a video communication. For example, the video communication may include an HTTP-based video communication such as MPEG DASH, a video communication based on MPEG media transport protocol (MMTP), and/or a video communication based on real-time object delivery over unidirectional transport (ROUTE).

Referring to FIG. 16, the parallelized information parallelized_unit_info according to some embodiments of the present disclosure may include the info_mode information, the user_info_flag information, the unit_num information, and/or the unit_id_bigcore information, and the unit_id_littlecore information as an XML format.

FIG. 17 illustrates the syntax of the paralleled unit information per video picture, according to some embodiments of the present disclosure.

The parallelized unit information according to some embodiments of the present disclosure may be calculated by a receiver, and may be transmitted through a broadcast network and/or a broadband for each video picture.

The parallelized unit information may include at least one of an info_mode field, a user_info_flag field, a unit_num field, a unit_complexity_list field, a unit_list_for_bigcore field, a unit_list_for_littlecore field, a user_info_size field, and a user_info_list field. The detailed contents of the parallelized unit information are the same as the contents described above.

FIG. 18 illustrates a supplemental enhancement information (SEI) message including the parallelized unit information according to some embodiments of the present disclosure.

FIG. 18 illustrates payload syntax of the SEI message in the international video standard. The SEI message represents additional information that is not essential in a decoding process of a video coding layer (VCL).

Parallelized unit information 1810 according to some embodiments of the present disclosure may be included in SEI messages of high efficiency video coding (HEVC), MPEG-4, and/or advanced video coding (AVC) and may be transmitted through a broadcast network and/or a broadband. For example, the SEI message may be included in compressed video data.

Figure 19:
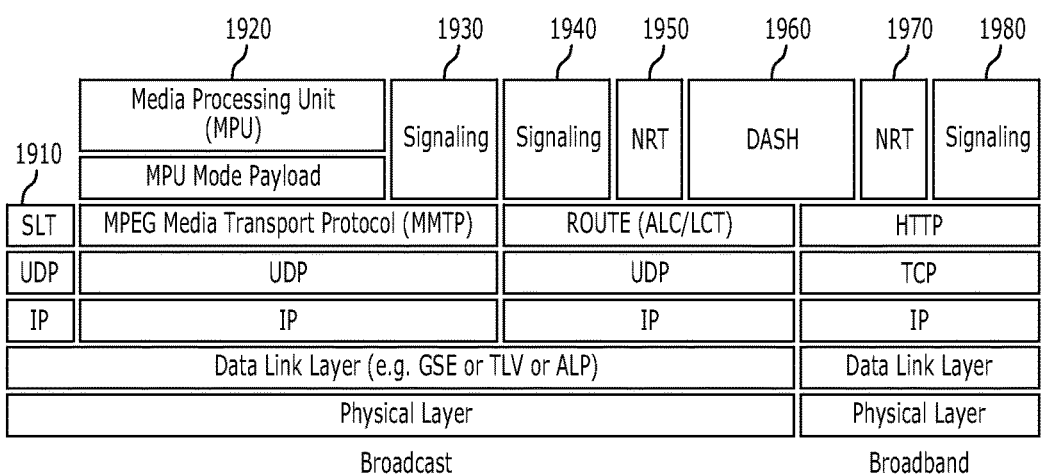
FIG. 19 illustrates signaling data including the parallelized unit information according to some embodiments of the present disclosure.

FIG. 19 illustrates signaling data including the parallelized unit information according to some embodiments of the present disclosure.

In FIG. 19, a protocol stack portion on a broadcast side may be divided into a portion transmitted through a service list table (SLT) and an MPEG media transport protocol (MMTP), and a portion transmitted through a real-time object delivery over unidirectional transport (ROUTE).

An SLT 1910 may be encapsulated through a user datagram protocol (UDP) and internet protocol (IP) layer. The MPEG media transport protocol (MMTP) may transmit data 1920 formatted in a media processing unit (MPU) format defined in MPEG media transport (MMT) and signaling data 1930 according to the MMTP. The data may be encapsulated through the UDP and the IP layer. The ROUTE may transmit data 1960 formatted in a dynamic adaptive streaming over HTTP (DASH) segment format, the signaling data 1940, and not-timed data such as non-real time (NRT). The data may also be encapsulated through the UDP and the IP layer.

A portion transmitted through the SLT and the MMTP, and a portion transmitted through the ROUTE may be processed in the UDP and IP layer, and then, may be encapsulated in a link layer (Data Link Layer) again. The broadcast data processed in the link layer may be multicasted as a broadcast signal after being encoded/interleaved in a physical layer.

In FIG. 19, a protocol stack portion on the broadband side may be transmitted through a hypertext transfer protocol (HTTP) as described above. The data 1960 formatted in the DASH segment format, the signaling data 1980, and the data 1970 such as NRT may be transmitted through the HTTP. Here, the signaling data illustrated in FIG. 19 may be signaling data relating to a service. The data may be processed through a transmission control protocol (TCP) and the IP layer, and then, may be encapsulated in the link layer. Thereafter, the processed broadband data may be unicasted to the broadband through processing for transmission in the physical layer.

The service may be a collection of media components that are displayed to a user as a whole, the components may be several media types, the service may be continuous or intermittent, the service may be real or non-real time, and a real-time service may be configured by a sequence of a program.

Service data (for example, video data and/or audio data) according to some embodiments of the present disclosure may be included in at least one of the data 1920 formatted in an MPU format, the non-timed data 1950 such as the NRT, and/or the data 1960 formatted in the DASH segment format.

The signaling data (for example, parallelized unit information) according to some embodiments of the present disclosure may be added to a separate file format, may be stored as a separate file, or may be transmitted through a broadcast network and/or a broadband through a separate signaling protocol.

For example, the signaling data (for example, parallelized unit information) according to some embodiments of the present disclosure may be included in at least one of the SLT 1910, the signaling data 1930, the signaling data 1940, and/or the signaling data 1980.

Figure 20:
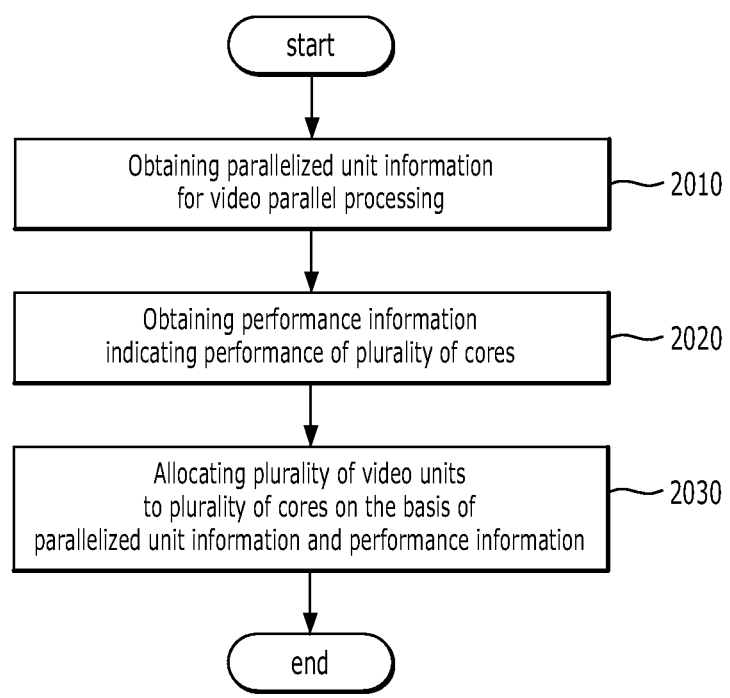
FIG. 20 illustrates a processing method according to some embodiments of the present disclosure.

FIG. 20 illustrates a processing method according to some embodiments of the present disclosure.

A processor according to some embodiments of the present disclosure may include a plurality of cores, and at least one memory including instructions executed by at least one of the plurality of cores.

The processor may obtain parallelized unit information for video parallel processing (2010).

In addition, the processor may obtain performance information indicating performance of the plurality of cores (2020).

In addition, the processor may allocate a plurality of video unit data to the plurality of cores, based on the parallelized unit information and the performance information (2030).

In addition, the processor may decode the plurality of video unit data in parallel using the plurality of cores.

For example, the video unit data may include at least one of symmetric tiles, asymmetric tiles, and a coding tree unit row. The symmetric tile and/or the asymmetric tile may be a square and/or a rectangle. Shapes of the symmetric tiles may be identical to each other. At least one of shapes of the asymmetric tiles may differ from the other shapes.

One embodiment of the present disclosure may support parallel encoding and decoding on a coding tree unit basis by dividing one picture into coding tree unit rows using wavefront parallel processing (WPP). Accordingly, one embodiment of the present disclosure may allocate the coding tree unit rows to big/little cores, based on computational complexity of coding tree units (CTUs) that have to be processed by each thread.

For example, the plurality of cores may be asymmetric cores. In addition, the plurality of cores may include at least one big core with first performance and at least one little core with second performance.

For example, the parallelized unit information may include at least one of complexity information indicating complexity of the plurality of video unit data, picture order count information indicating a picture order count (POC), mode information indicating a mode of information included in the parallelized unit information, and video unit number information indicating the number of the plurality of video unit data.

In addition, the complexity information may include computational complexity list information indicating computational complexity of the plurality of video unit data.

In addition, the picture order count information may indicate the above-described poc_num information, the mode information may indicate the above-described info_mode information, and the video unit number information may indicate the above-described unit_num information.

In addition, the parallelized unit information may include first list information including a video unit list to be allocated to the at least one big core and second list information including a video unit list to be allocated to the at least one little core.

In addition, the first list information may indicate the above-described unit_list_for_bigcore information, and the second list information may indicate the above-described unit_list_for_littlecore information.

A processor may obtain the parallelized unit information by directly calculating the parallelized unit information. In addition, the processor may receive the parallelized unit information through a broadcast network and/or a broadband.

For example, the parallelized unit information may be received through at least one of a supplemental enhancement information (SEI) message, a video usability information (VUI) message, a slice header, and signaling data.

Complexity may be determined based on at least one of the number of prediction units included in the plurality of video unit data and sizes of the plurality of video unit data.

In addition, the processor may sort the plurality of video unit data in descending order based on the complexity information. Thereafter, the processor may sequentially allocate the plurality of video unit data to the plurality of cores from the video unit with the highest complexity.

In addition, the processor may acquire complexity allocation information indicating complexity that can be allocated to each core, based on the performance information and the complexity information. In addition, the processor may sort the plurality of cores in descending order, based on the complexity allocation information. Thereafter, the processor may sequentially allocate the plurality of video unit data from the core with the highest complexity allocation information. For example, the processor may first allocate the plurality of video unit data to the big cores and may allocate the remaining video unit data to the little cores.

In addition, the processor may determine whether or not the video unit data can be allocated to the cores. Thereafter, the processor may allocate the maximum number of video unit data that can be allocated within a range indicated by the complexity allocation information, to each core. For example, if the video unit data deviate from an allocation range of the corresponding core while the video unit data are allocated to the cores, the processor determines whether or not a next video unit with complexity lower than the immediately preceding video unit can be allocated to the corresponding core. In this way, the processor may allocate an optimal number of video unit data to each core.

Figure 21:
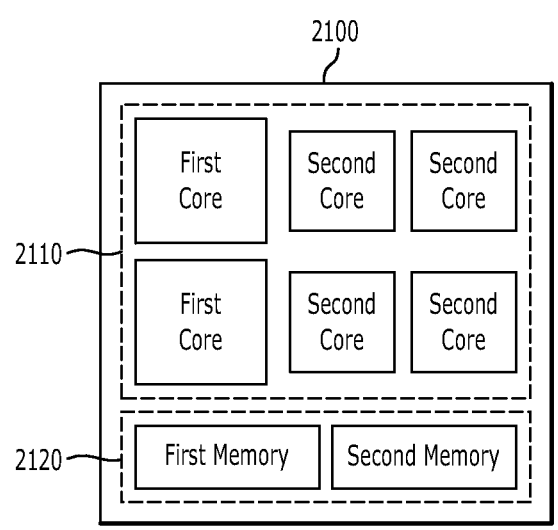
FIG. 21 illustrates a processor according to some embodiments of the present disclosure.

FIG. 21 illustrates a processor according to some embodiments of the present disclosure.

A processor 2100 according to some embodiments of the present disclosure may include a plurality of cores 2110, and at least one memory 2120 including instructions executed by at least one of the plurality of cores.

The instructions may include instructions for performing steps of obtaining parallelized unit information for video parallel processing;
obtaining performance information indicating performance of the plurality of cores; and allocating a plurality of video unit data to the plurality of cores based on the parallelized unit information and the performance information.

In addition, the instructions may further include steps of sorting the plurality of video unit data in descending order based on complexity information, obtaining complexity allocation information indicating complexity that can be allocated to each core based on the performance information and the complexity information, sorting the plurality of cores in descending order based on the complexity allocation information, and determining whether or not the video unit data can be allocated to the cores.

Detailed contents of the processor according to some embodiments of the present disclosure may include all of the above-described processing methods.

Figure 22:
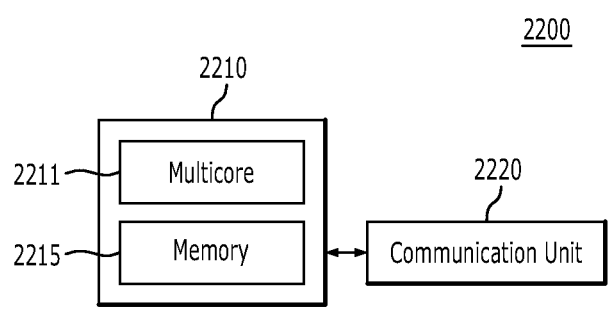
FIG. 22 illustrates an image reception device according to some embodiments of the present disclosure.

FIG. 22 illustrates an image reception device according to an embodiment of the present disclosure.

An image reception device 2200 according to some embodiments of the present disclosure may include at least one of a processor 2210 and a communication unit 2220.

The processor 2210 may include a multicore 2211 including a plurality of cores and at least one memory 2215 including instructions executed by at least one of the plurality of cores. Detailed contents of the processor 2210 may include all of the contents of the above-mentioned processor. The memory 2215 may be included in the processor 2210 and may be included in an external device other than the processor 2210.

The communication unit 2220 may receive data through a broadcast network and/or a broadband. For example, the data may include video data, audio data, and/or signaling data.

For example, the video data and/or the audio data may include an SEI message including the above-described parallelized unit information. In addition, the signaling data may also include the above-described parallelized unit information.

In addition, an image reception method according to an embodiment of the present disclosure may include steps for controlling the above-described image reception device. Detailed contents of the video reception method may include all of contents of the video reception device.

Figure 23:
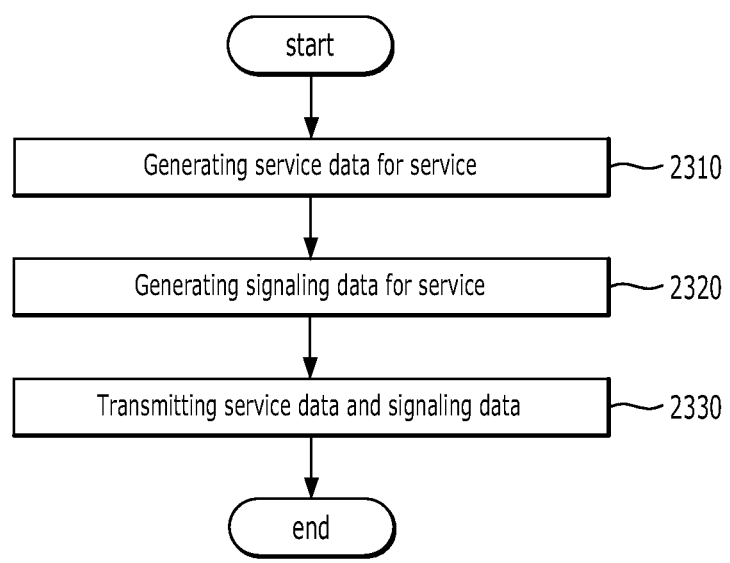
FIG. 23 illustrates an image transmission method according to some embodiments of the present disclosure.

FIG. 23 illustrates an image transmission method according to an embodiment of the present disclosure.

An image transmission device may generate service data for the service using a processor (2210). For example, the video transmission device may encode a video image. Service data may include encoded video data and encoded audio data. The video data may include an SEI message including parallelized unit information for video parallel processing.

In addition, the image transmission device may generate signaling data for the service using the processor (2220). For example, the signaling data may include the parallelized unit information for video parallel processing.

In addition, the image transmission device may transmit the service data and the signaling data using a communication unit (2330).

The image transmission method according to some embodiments of the present disclosure may perform an operation opposite to the image reception device and/or the processor described above. Accordingly, detailed contents of the image transmission device according to some embodiments of the present disclosure may include all of necessary contents among contents of the image reception device and/or the processor described above.

Figure 24:
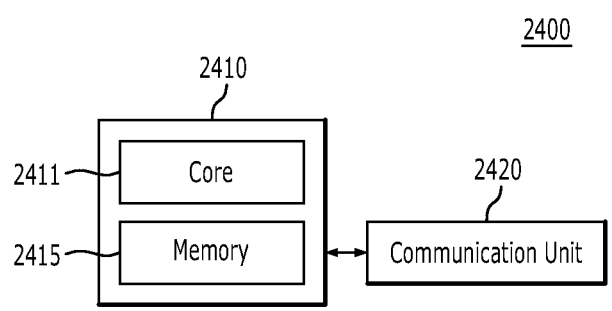
FIG. 24 illustrates an image transmission device according to some embodiments of the present disclosure.

FIG. 24 illustrates an image transmission device according to an embodiment of the present disclosure.

An image transmission device 2400 according to an embodiment of the present disclosure may include a processor 2410, and/or a communication unit 2420. The processor 2410 may include at least one core 2411, and at least one memory 2415 including instructions executed by the at least one core.

The image transmission device according to some embodiments of the present disclosure may include all of contents of the image transmission method described above.

In addition, according to the embodiment disclosed herein, the above-described method may be performed as a code that can be read by a processor at a medium on which a program is recorded. An example of the medium that can be read by the processor includes a ROM, a RAM, a CD-ROM, a magnetic tape, a floppy disk, an optical data storage device, and the like, and also includes an element that is realized in a form of a downloadable file.

The above-described electronic device may not be limited to the configuration and the method of the above-described embodiments, and may be configured by selectively combining all or a part of the respective embodiments such that the above embodiments can be modified in various ways.

As described above, embodiments of the present disclosure are described with reference to the accompanying drawings. Here, terms and words used in the present disclosure and claims should not be construed as limited to ordinary or dictionary meaning, and should be construed in a sense and concept consistent with the technical idea of the present disclosure.

The scope of the present disclosure is not limited to the embodiments disclosed in this disclosure, and the disclosure may be modified, changed, or improved in various forms within the scope of the present disclosure and the claims.

What is claimed is:

1. A processing method comprising:
obtaining parallelized unit information for video parallel processing;
obtaining performance information that indicates performance of a plurality of cores; and
allocating a plurality of video unit data to the plurality of cores based on the parallelized unit information and the performance information,
wherein the parallelized unit information includes complexity information that indicates complexity of the plurality of video unit data;
wherein the allocating includes obtaining complexity allocation information that indicates complexity allowing the allocation to each core based on the performance information and the complexity information; and
determining whether or not the video unit data are able to be allocated to the cores,
wherein maximum number of video unit data that are allowed within a range indicated by the complexity allocation information are allocated to each core.

2. The processing method according to claim 1, wherein the video unit data include at least one of a symmetric tile, an asymmetric tile, and a coding tree unit row.

3. The processing method according to claim 1, wherein the parallelized unit information further includes at least one of picture order count information that indicates a picture order count (POC), mode information that indicates a mode of information which is included in the parallelized unit information, and video unit number information that indicates the number of the plurality of video unit data.

4. The processing method according to claim 1,
wherein the plurality of cores includes at least one big core with first performance and at least one little core with second performance, and
wherein the parallelized unit information further includes at least one of first list information that includes a video unit list to be allocated to the at least one big core and second list information that includes a video unit data to be allocated to the at least one little core.

5. The processing method according to claim 1, wherein the parallelized unit information is received through at least one of a supplemental enhancement information (SEI) message, a video usability information (VUI) message, a slice header, and signaling data.

6. The processing method according to claim 1, wherein the complexity is determined based on at least one of the number of prediction units that are included in the plurality of video unit data and a size of the plurality of video unit data.

7. The processing method according to claim 1,
wherein the allocating includes sorting the plurality of video unit data in descending order based on the complexity information, and
wherein the plurality of video unit data are sequentially allocated to the plurality of cores from video unit data with the highest complexity.

8. The processing method according to claim 7,
wherein the allocating further includes
sorting the plurality of cores in descending order based on the complexity allocation information, and
wherein the plurality of video unit data are sequentially allocated from a core with the highest complexity allocation information.

9. A processor comprising:
a plurality of cores; and
at least one memory configured to include instructions that are executed by at least one of the plurality of cores,
wherein the instructions include instructions for performing,
obtaining parallelized unit information for video parallel processing;
obtaining performance information that indicates performance of the plurality of cores; and
allocating a plurality of video unit data to the plurality of cores based on the parallelized unit information and the performance information, and
wherein the parallelized unit information includes complexity information that indicates complexity of the plurality of video unit data;
wherein the allocating further includes obtaining complexity allocation information that indicates complexity allowing allocation to each core based on the performance information and the complexity information and determining whether or not the video unit data are able to be allocated to the cores, and
wherein maximum number of video unit data that are allowed within a range indicated by the complexity allocation information are allocated to each core.

10. The processor according to claim 9, wherein the video unit data include at least one of a symmetric tile, an asymmetric tile, and a coding tree unit row.

11. The processor according to claim 9, wherein the parallelized unit information further includes at least one of picture order count information that indicates a picture order count (POC), mode information that indicates a mode of information which is included in the parallelized unit information, and video unit number information that indicates the number of the plurality of video unit data.

12. The processor according to claim 9,
wherein the plurality of cores includes at least one big core with first performance and at least one little core with second performance, and
wherein the parallelized unit information further includes at least one of first list information that includes a video unit list to be allocated to the at least one big core and second list information that includes a video unit data to be allocated to the at least one little core.

13. The processor according to claim 9, wherein the parallelized unit information is received through at least one of a supplemental enhancement information (SEI) message, a video usability information (VUI) message, a slice header, and signaling data.

14. The processor according to claim 9, wherein the complexity is determined based on at least one of the number of prediction units that are included in the plurality of video unit data and a size of the plurality of video units.

15. The processor according to claim 9,
wherein the allocating includes sorting the plurality of video unit data in descending order based on the complexity information, and
wherein the plurality of video unit data are sequentially allocated to the plurality of cores from video unit data with the highest complexity.

16. The processor according to claim 15,
wherein the allocating further includes
sorting the plurality of cores in descending order based on the basis of the complexity allocation information, and
wherein the plurality of video unit data are sequentially allocated from a core with the highest complexity allocation information.

* * * * *